US012693869B2

(12) United States Patent
Zhang et al.

(10) Patent No.: US 12,693,869 B2
(45) Date of Patent: Jul. 28, 2026

(54) SERVER SYSTEM STARTING METHOD, APPARATUS, ELECTRONIC DEVICE AND STORAGE MEDIUM

(71) Applicant: Beijing Bytedance Network Technology Co., Ltd., Beijing (CN)

(72) Inventors: Yang Zhang, Beijing (CN); Xiaohui Zhu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 80 days.

(21) Appl. No.: 18/561,944

(22) PCT Filed: Oct. 17, 2022

(86) PCT No.: PCT/CN2022/125589
§ 371 (c)(1),
(2) Date: Nov. 17, 2023

(87) PCT Pub. No.: WO2023/082944
PCT Pub. Date: May 19, 2023

(65) Prior Publication Data
US 2024/0241729 A1      Jul. 18, 2024

(30) Foreign Application Priority Data
Nov. 12, 2021    (CN) .......................... 202111341197.1

(51) Int. Cl.
*G06F 9/00* (2018.01)
*G06F 9/4401* (2018.01)
*G06F 15/177* (2006.01)

(52) U.S. Cl.
CPC ................................. *G06F 9/4406* (2013.01)

(58) Field of Classification Search
CPC .................................................... G06F 9/4406
See application file for complete search history.

(56) References Cited

U.S. PATENT DOCUMENTS 7,971,045 B1 *    6/2011    Currid ................... G06F 9/4408
                                                                713/1
10,404,622 B2 *   9/2019    Tripathi ............. H04L 63/0263
                                (Continued)

FOREIGN PATENT DOCUMENTS

CN          101944129 A  *   9/2010   ............. G06F 17/30
CN          106598560 A      4/2017
                                (Continued)

OTHER PUBLICATIONS

International Search Report and Written Opinion issued Jan. 17, 2023 in International Application No. PCT/CN2022/125589, with partial English translation (5 pages).

*Primary Examiner* — Mohammed H Rehman

(57) ABSTRACT

The embodiments of the present disclosure relate to a server system starting method, apparatus, electronic device and storage medium. A host sends a block device access request to a network card for obtaining mirror image data corresponding to a root file system based on a NVMf communication connection; the network card obtains the mirror image data corresponding to the root file system from a target storage node of a storage cluster, and sends the mirror image data corresponding to the root file system to the host based on the NVMf communication connection; the host mounts the root file system to complete system startup.

18 Claims, 5 Drawing Sheets

(56)  References Cited

U.S. PATENT DOCUMENTS

| | | | | |
|---|---|---|---|---|
| 2007/0294563 | A1* | 12/2007 | Bose ................... | G06F 11/2092 |
| | | | | 714/5.11 |
| 2008/0301425 | A1 | 12/2008 | Mittapalli et al. | |
| 2012/0005472 | A1* | 1/2012 | Nagai ....................... | G06F 8/63 |
| | | | | 713/2 |
| 2012/0102159 | A1* | 4/2012 | Luo ....................... | G06F 9/4416 |
| | | | | 709/220 |
| 2013/0179669 | A1* | 7/2013 | Song ...................... | H04L 63/10 |
| | | | | 713/2 |
| 2016/0299767 | A1* | 10/2016 | Mukadam ............. | G06F 13/426 |
| 2020/0184078 | A1* | 6/2020 | Hinrichs ............... | H04L 9/3268 |
| 2025/0337571 | A1* | 10/2025 | Rannou .................... | G06F 8/61 |

FOREIGN PATENT DOCUMENTS

| | | |
|---|---|---|
| CN | 103516800 A | 4/2018 |
| CN | 112328312 A | 2/2021 |
| CN | 114064135 A | 2/2022 |
| WO | 2020259418 A1 | 12/2020 |

* cited by examiner

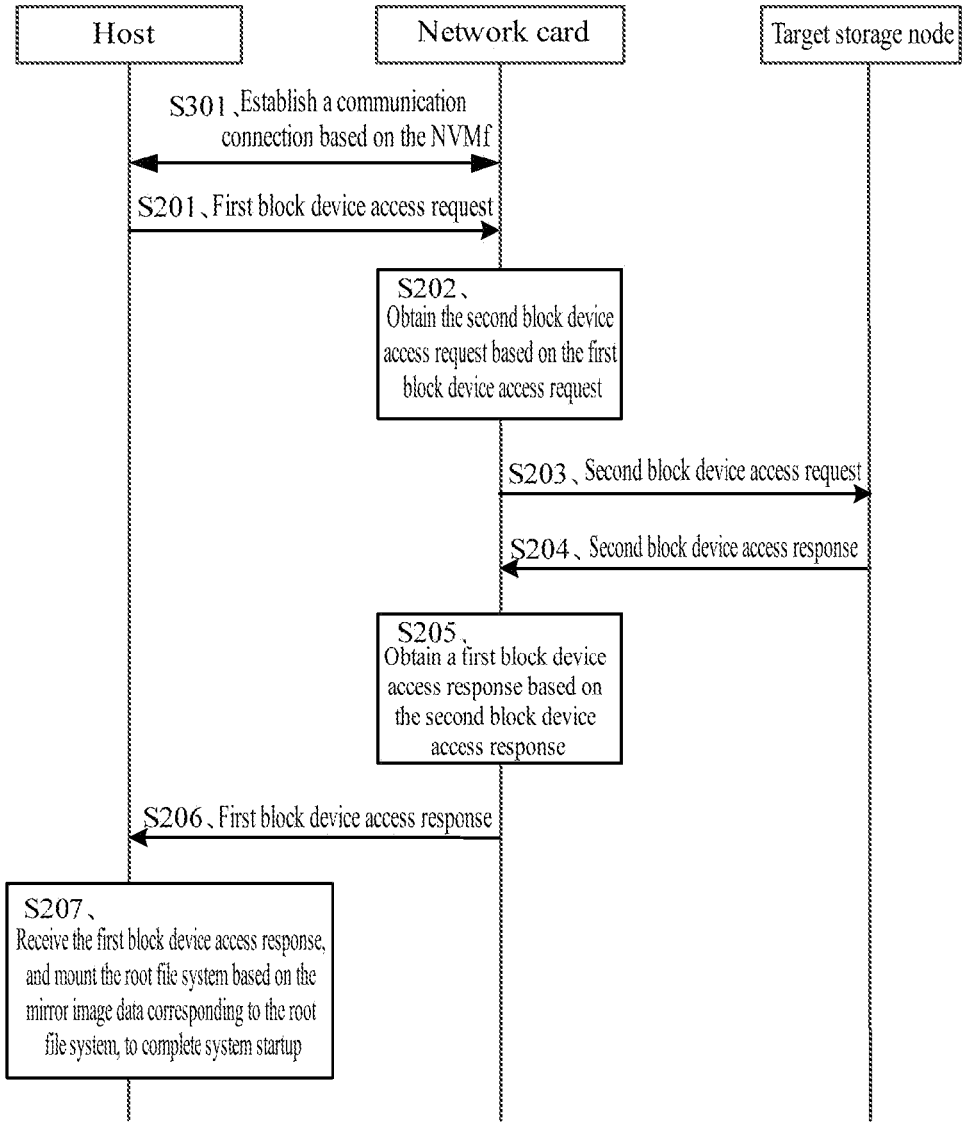

Host          Network card          Target storage node

S301、Establish a communication
connection based on the NVMf

S201、First block device access request

S202、
Obtain the second block device
access request based on the first
block device access request S203、Second block device access request S204、Second block device access response S205、
Obtain a first block device
access response based on
the second block device
access response S206、First block device access response S207、
Receive the first block device access response,
and mount the root file system based on the
mirror image data corresponding to the root
file system, to complete system startup

Fig.4

SERVER SYSTEM STARTING METHOD, APPARATUS, ELECTRONIC DEVICE AND STORAGE MEDIUM

CROSS-REFERENCE TO RELATED APPLICATIONS

This application is based on and claims the priority of the application with Chinese application number 202111341197.1, filed on Nov. 12, 2021, the disclosure content of which is hereby incorporated into this application in its entirety.

TECHNICAL FIELD

The present disclosure relates to the field of computer technology, and in particular, to a server system starting method, apparatus, electronic device and storage medium.

BACKGROUND

With the advent of the big data era and the development of cloud computing technology, servers are increasingly using network storage clusters for system startup. That is, the servers do not have local hard disks. When a system starts, it connects to a storage cluster through a network to obtain a kernel mirror image file and a root file system mirror image, etc.

SUMMARY

In a first aspect, the present disclosure provides a server system starting method, the server comprising: a host and a network card, the host and the network card being based on a non-volatile memory standard NVMf communication connection on a network, the network card being connected communicatively with a storage cluster. The method comprises:

sending a first block device access request to the network card by the host based on the NVMf communication connection, where the first block device access request comprises at least a non-volatile memory standard qualified name NON corresponding to the NVMf, the first block device access request being used to obtain mirror image data corresponding to a root file system;

obtaining a second block device access request by the network card based on the first block device access request, the second block device access request including a second block device identifier corresponding to the NON;

sending the second block device access request to a target storage node where the block device corresponding to the second block device identifier is located by the network card, and receiving a second block device access response sent by the target storage node, the second block device access response including at least the mirror image data corresponding to the root file system;

obtaining a first block device access response by the network card based on the second block device access response, the first block device access response including at least the mirror image data corresponding to the root file system;

sending the first block device access response to the host by the network card based on the NVMf communication connection; and receiving the first block device access response by the host and mounts the root file system based on the mirror image data corresponding to the root file system to complete the system startup.

In some embodiments, the host includes: a block device layer, an NVMf host layer and a remote direct data access RDMA layer, and the network card includes: an RDMA layer, an NVMf target layer, a general block layer and a storage client layer;

the sending a first block device access request to the network card by the host based on the NVMf communication connection comprises:

the block device layer of the host generating an NVMe block device access request according to a first block device identifier, and submitting the NVMe block device access request to the NVMf host layer of the host, the NVMe block device access request including the first block device identifier;

the NVMf host layer of the host encapsulating the NVMe block device access request into a first block device access request that complies with the NVMf protocol, and sending it to the RDMA layer of the network card through the RDMA layer of the host, the first block device access request including at least the NON;

the obtaining a second block device access request by the network card based on the first block device access request comprises:

the RDMA layer of the network card receiving the first block device access request and submitting the first block device access request to the NVMf target layer of the network card;

the NVMf target layer of the network card submitting the first block device access request to the general block layer of the network card;

the general block layer of the network card determining the second block device identifier corresponding to the NON based on the NON, and generating a second block device access request;

the general block layer of the network card submitting the second block device access request to the storage client layer.

In some embodiments, the NVMf target layer of the network card submitting the first block device access request to the general block layer of the network card comprises:

the NVMf target layer of the network card performing protocol conversion on the first block device access request, and converting the first block device access request into an internal communication protocol;

the NVMf target layer of the network card submitting the first block device access request to the general block layer of the network card based on the internal communication protocol.

In some embodiments, the sending the second block device access request to a target storage node where the block device corresponding to the second block device identifier is located by the network card comprises:

the storage client layer of the network card performing protocol conversion on the second block device access request, and converting the second block device access request into a protocol that complies with communication with storage nodes of the storage cluster;

the storage client layer of the network card sending the second block device access request to the target storage node where the block device corresponding to the second block device identifier is located based on the protocol for communicating with storage nodes of the storage cluster.

In some embodiments, prior to the host sending the first block device access request to the network card based on the NVMf communication connection, it further comprises:

the host and the network card establishing a communication connection based on the non-volatile memory standard NVMf on the network.

In some embodiments, the host and the network card establishing a communication connection based on the non-volatile memory standard NVMf on the network comprises:

the host obtaining a NVMf driver and configuration information of an NVMf target, wherein the configuration information of the NVMf target includes: an Internet Protocol IP address, a port, the NON and a transport layer protocol of the NVMf target;

the host sending a communication connection establishment request to the network card based on the configuration information of the NVMf target, the communication connection establishment request being used to request communication with the network card based on the NVMf;

the host receiving a communication connection establishment response sent by the network card, the communication connection establishment response being used to indicate that the connection establishment is successful;

the host generating the first block device identifier.

In a second aspect, the present disclosure provides a server system starting apparatus, comprising: a host and a network card, the host and the network card being based on a non-volatile memory standard NVMf communication connection on a network, the network card being connected communicatively with a storage cluster, the host is configured to send a first block device access request to the network card based on the NVMf communication connection, wherein the first block device access request includes: at least a non-volatile memory standard qualified name NON corresponding to the NVMf, the first block device access request being used to obtain mirror image data corresponding to a root file system;

the network card is configured to obtain a second block device access request based on the first block device access request, the second block device access request including a second block device identifier corresponding to the NON;

the network card is further configured to send the second block device access request to a target storage node where the block device corresponding to the second block device identifier is located; and receive a second block device access response sent by the target storage node, the second block device access response including at least the mirror image data corresponding to the root file system;

the network card is further configured to obtain a first block device access response based on the second block device access response, the first block device access response including at least the mirror image data corresponding to the root file system;

the network card is further configured to send the first block device access response to the host based on the NVMf communication connection;

the host is further configured to receive the first block device access response and mounts the root file system based on the mirror image data corresponding to the root file system to complete the system startup.

In some embodiments, the host includes: a block device layer, an NVMf host layer and a remote direct data access RDMA layer, and the network card includes: an RDMA layer, an NVMf target layer, a general block layer and a storage client layer;

the block device layer of the host is configured to generate an NVMe block device access request according to a first block device identifier, and submit the NVMe block device access request to the NVMf host layer of the host, the NVMe block device access request including the first block device identifier;

the NVMf host layer of the host is configured to encapsulate the NVMe block device access request into a first block device access request that complies with the NVMf protocol, and send it to the RDMA layer of the network card through the RDMA layer of the host, the first block device access request including at least the NON;

the RDMA layer of the network card is configured to receive the first block device access request and submit the first block device access request to the NVMf target layer of the network card;

the NVMf target layer of the network card is configured to submit the first block device access request to the general block layer of the network card;

the general block layer of the network card is configured to determine the second block device identifier corresponding to the NON based on the NON, and generate a second block device access request;

the general block layer of the network card is further configured to submit the second block device access request to the storage client layer.

In some embodiments, the NVMf target layer of the network card is specifically configured to perform protocol conversion on the first block device access request, and convert the first block device access request into an internal communication protocol;

the NVMf target layer of the network card is specifically configured to submit the first block device access request to the general block layer of the network card based on the internal communication protocol.

In some embodiments, the storage client layer of the network card is configured to perform protocol conversion on the second block device access request, and convert the second block device access request into a protocol that complies with communication with storage nodes of the storage cluster;

the storage client layer of the network card is further configured to send the second block device access request to the target storage node where the block device corresponding to the second block device identifier is located based on the protocol for communicating with storage nodes of the storage cluster.

In some embodiments, the host is further configured to establish a communication connection with the network card based on the non-volatile memory standard NVMf on the network.

In some embodiments, the host is specifically configured to obtain a NVMf driver and configuration information of an NVMf target, where the configuration information of the NVMf target includes: an Internet Protocol IP address, a port, the NON and a transport layer protocol of the NVMf target;

the host is specifically configured to send a communication connection establishment request to the network card based on the configuration information of the NVMf target, the communication connection establishment request being used to request communication with the network card based on NVMf;

the host is specifically configured to receive a communication connection establishment response sent by the network card, the communication connection establishment response being used to indicate that the connection establishment is successful;

the host is specifically configured to generate the first block device identifier.

In a third aspect, the present disclosure provides an electronic device, comprising: a processor configured to execute a computer program stored in a memory, which, when executed by the processor, implement the steps of the method of any one of the first aspect.

In a fourth aspect, the present disclosure provides a computer-readable storage medium having a computer program stored thereon, which, when executed by a processor, implement the steps of the method of any one of the first aspect.

In a fifth aspect, the present disclosure provides a computer program product, which, when run on a computer, causes the computer to execute the server system starting method of any one of the first aspect.

In the server system starting method provided by the embodiment of the present disclosure, a host sends a first block device access request to a network card based on a NVMf communication connection, the first block device access request being used to obtain mirror image data corresponding to a root file system; the network card obtains a second block device access request based on the first block device access request, the second block device access request including a second block device identifier corresponding to the NON; the network card sends the second block device access request to a target storage node where the block device corresponding to the second block device identifier is located; the network card receives a second block device access response sent by the target storage node, the second block device access response including target data and the second block device identifier, the target data including mirror image data corresponding to a root file system; the network card obtains a first block device access response based on the second block device access response, the first block device access response including the target data and the first block device identifier; the network card sends the first block device access response to the host based on the NVMf communication connection; the host mounts the root file system based on the mirror image data corresponding to the root file system to complete the system startup. Because the NVMf protocol can provide faster data reading speed and lower access latency than the existing iSCSI protocol, and the host obtains the mirror image data corresponding to the root file system from the network card based on the NVMf communication connection.

BRIEF DESCRIPTION OF THE DRAWINGS

The accompanying drawings, which are incorporated in and constitute a part of this specification, illustrate embodiments consistent with the disclosure and serve to explain the principles of the disclosure together with the description. In order to more clearly illustrate the technical solutions in the embodiments of the present disclosure or related arts, the following will briefly introduce the drawings needed when describing the embodiments or related arts. Obviously, for those of ordinary skill in the art, other drawings can also be obtained based on these drawings without incurring any creative effort.

FIG. 4 is a schematic flowchart of another server system starting method provided by some embodiments of the present disclosure;

DETAILED DESCRIPTION

Figure 1:
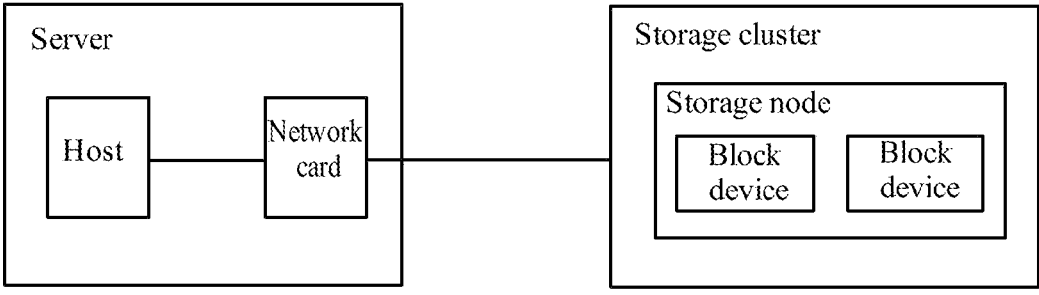
FIG. 1 is a network architecture diagram of a server startup provided by some embodiments of the present disclosure.

In order to understand the above objects, features and advantages of the present disclosure more clearly, the solutions of the present disclosure will be further described below. It should be noted that, without conflict, the embodiments of the present disclosure and the features in the embodiments can be combined with each other.

Many specific details are set forth in the following description to facilitate to fully understand the present disclosure, but the present disclosure can also be implemented in other ways different from those described here; obviously, the embodiments in the description are only part of the embodiments of the present disclosure, not all of the embodiments thereof.

Currently, when a server starts the system through a network, it usually uses the internet Small Computer System Interface (iSCSI) protocol to communicate with a storage cluster. That is, after the server is powered on, it runs the Basic Input Output System (BIOS) to obtain a boot loader, a kernel mirror image file, etc. from the storage cluster through the iSCSI protocol, and loads the kernel mirror image file according to the boot loader to start the kernel, which obtains a root file system mirror image from the storage cluster through the iSCSI protocol, mounts the root file system, and completes the system startup of the server.

However, with related technologies, the efficiency of the server system startup is not high.

In order to solve the above technical problems or at least partially solve the above technical problems, the present disclosure provides a server system starting method, apparatus, electronic device and storage medium.

In a cloud computing system, a server usually does not have a local hard disk, and the BIOS is run when the system starts to obtain a kernel mirror image file, a root file system mirror image, etc. from a storage cluster through the iSCSI protocol. However, the iSCSI protocol has slow read and write speeds and large storage access latency, resulting in inefficient of the server system startup. Moreover, after the system startup is completed, the server can only perform input/output (I/O) operations on block devices of the storage cluster through the iSCSI protocol, which affects the storage performance of the server.

Non-Volatile Memory express (NVMe) is an interface specification for Peripheral Component Interconnect express (PCIe) solid-state hard disks. NVMe takes advantage of the low latency and parallelism of PCIe channels to greatly improve the read and write performance of storage devices. The non-volatile memory express over Fabric (NVMf) standard on the network further utilizes the high performance provided by the NVMe protocol into a network interconnection structure of the NVMe storage system. The NVMf protocol defines how to implement NVMe functions using various common transport layer protocols (such as Remote Direct Memory Access (RDMA) protocol, Fiber Channel (FC), etc.).

The present disclosure provides a server system starting method, which is applied to a server. The server comprises: a host and a network card, the host and the network card being based on a NVMf communication connection, the network card being connected communicatively with block devices of a storage cluster. The method comprises: sending a first block device access request to the network card by the host based on the NVMf communication connection, where the first block device access request comprises a NVMe qualified name corresponding to the NVMf, the first block device access request being used to obtain mirror image data corresponding to a root file system; processing the first block device access request by the network card to obtain a second block device access request, the second block device access request including a second block device identifier corresponding to the NON; sending the second block device access request to a target storage node where the block device corresponding to the second block device identifier is located by the network card; receiving, by the network card, the second block device access response sent by the target storage node, the second block device access response including the mirror image data corresponding to the root file system; processing the second block device access response by the network card to obtain the first block device access response, the first block device access response including the mirror image data corresponding to the root file system; sending the first block device access response to the host by the network card based on the NVMf communication connection; receiving the first block device access response by the host and mounting the root file system based on the mirror image data corresponding to the root file system to complete the system startup. Because the NVMf protocol can provide faster data reading speed and lower access latency than the existing iSCSI protocol, and the host obtains the mirror image data corresponding to the root file system from the network card based on the NVMf communication connection, the storage access latency of the host is reduced, thereby improving the efficiency of server system startup.

The technical solution of the present disclosure will be described below with several specific embodiments. For the same or similar concepts, reference can be made to each other, and details will not be repeated in every place.

FIG. 1 is a network architecture diagram of a server startup provided by some embodiments of the present disclosure. As shown in FIG. 1, the network architecture of the server startup provided by the embodiment comprises: a server and a storage cluster. Wherein, the server comprises: a host and a network card; the storage cluster comprises: at least one storage node, each storage node including at least one block device. The host and the network card are based on a NVMf communication connection, and the network card is communicatively connected with the storage cluster.

In some embodiments, the network card may be a smart network card equipped with a system on chip (SoC). The SoC has a built-in microprocessor and a memory and can run an independent operating system. The storage cluster can be a distributed file system, such as Ceph, Hadoop distributed file system, etc.

Figure 2:
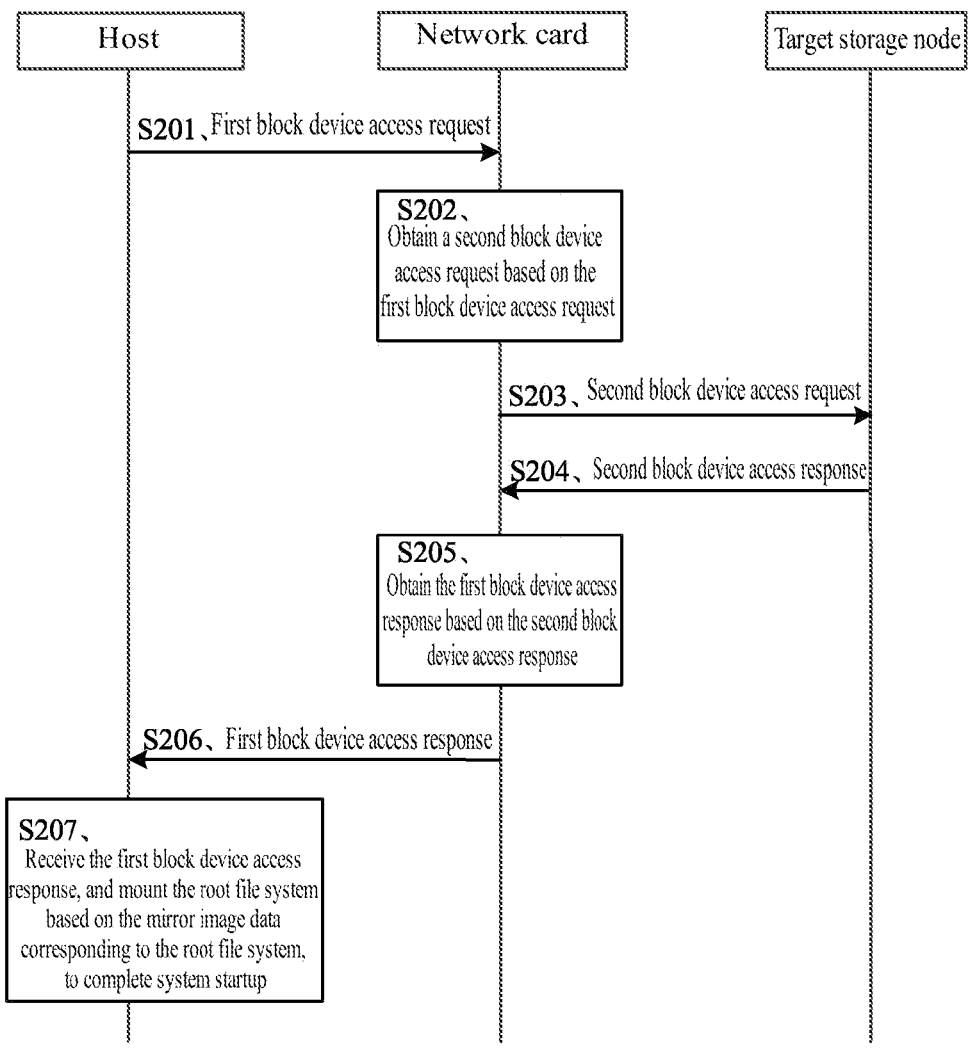
FIG. 2 is a schematic flowchart of a server system starting method provided by some embodiments of the present disclosure.

FIG. 2 is a schematic flowchart of a server system starting method provided by some embodiments of the disclosure.

The server system starting method in the embodiment of the disclosure is applied to the server shown in FIG. 1. As shown in FIG. 2, the method of the embodiment comprises:

S201: the host sending a first block device access request to a network card based on an NVMf communication connection.

Wherein, the first block device access request includes at least a non-volatile memory qualified name (NVMe Qualified Name, NON) corresponding to the NVMf, the first block device access request being used to obtain mirror image data corresponding to a root file system. In some embodiments, the first block device access request may also include a first block device identifier.

The root file system (rootfs) refers to file data and respective directory structure required when a Linux system of the the server is running.

Figure 3:
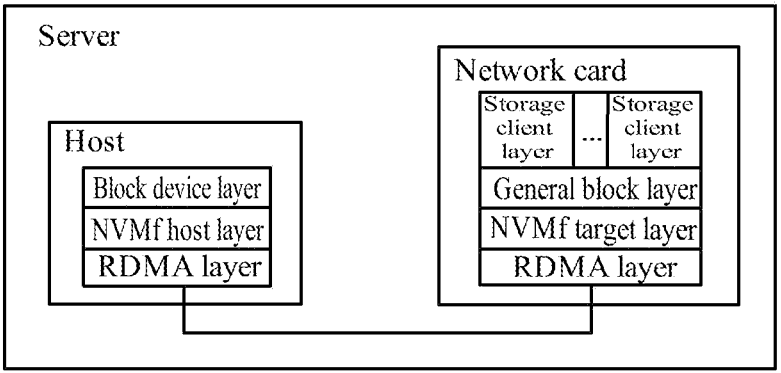
FIG. 3 is a schematic structural diagram of a server provided by some embodiments of the present disclosure.

In some embodiments, the host includes a block device layer, an NVMf host layer and an RDMA layer, and the network card includes an RDMA layer, an NVMf target layer, a general block layer and a storage client layer, as shown in FIG. 3. The general block layer of the network card can adapt to multiple storage client layers, and the network card is connected communicatively with the storage cluster through the storage client layer. The RDMA layer, NVMf target layer, general block layer and storage client layer of the network card can be implemented through software, for example, through a Storage Performance Development Kit (SPDK), which is a toolset used to write high-performance, highly scalable user state storage applications.

Based on the server shown in FIG. 3, one possible implementation is:

S2011: the block device layer of the host generating an NVMe block device access request based on a first block device identifier, and submitting the NVMe block device access request to the NVMf host layer of the host.

Wherein, the NVMe block device access request includes the first block device identifier. The first block device identifier represents a virtual NVMe block device of the host, the NVMe block device access request being used to obtain block data of the virtual NVMe block device corresponding to the first block device identifier.

In some embodiments, the NVMe block device access request also includes: a starting number of the data blocks and the number of data blocks, where the starting number of the data blocks represents the starting number of the block data obtained by the NVMe block device access request stored in the virtual NVMe block device, and the number of data blocks represents the size of the block data obtained by the NVMe block device access request.

S2012: the NVMf host layer of the host encapsulating the NVMe block device access request into the first block device access request that complies with the NVMf protocol, and sending it to the RDMA layer of the network card through the RDMA layer of the host.

In some embodiments, the NVMf host layer of the host encapsulates the NVMe block device access request into the first block device access request that complies with the NVMf protocol according to configuration information of a NVMf target. The first block device request may include: NON and NVMe block device access requests in the configuration information of the NVMf target, which sent to the RDMA layer of the network card through the RDMA layer of the host.

S202: the network card obtaining a second block device access request based on the first block device access request.

Wherein, the second block device access request includes a second block device identifier corresponding to the NON.

Based on the server shown in FIG. 3, one possible implementation is:

S2021: the RDMA layer of the network card receiving the first block device access request and submitting the first block device access request to the NVMf target layer of the network card.

S2022: The NVMf target layer of the network card submitting the first block device access request to the general block layer of the network card.

In some embodiments, the NVMf target layer of the network card performs protocol conversion on the first block device access request, and converts the first block device access request into an internal communication protocol.

Wherein, the internal communication protocol may be in a format that supports the SPDK internal communication protocol.

The NVMf target layer of the network card submits the first block device access request to the general block layer of the network card based on the internal communication protocol.

S2023: the general block layer of the network card determining the second block device identifier corresponding to the NON based on the NON, and generating a second block device access request.

Wherein, the second block device access request includes: the second block device identifier corresponding to the NON, the second block device access request being used to obtain data stored on a block device in the storage cluster corresponding to the second block device identifier, the data stored on the block device in the storage cluster corresponding to the second block device identifier including: mirror image data corresponding to a root file system.

S2024: the general block layer of the network card submitting the second block device access request to a storage client layer.

S203: the network card sending a second block device access request to a target storage node where the block device corresponding to the second block device identifier is located.

Based on the server shown in FIG. 3, one possible implementation is:

S2031: the storage client layer of the network card performing protocol conversion on the second block device access request, and converting the second block device access request into a protocol that complies with communication with storage nodes of the storage cluster.

In some embodiments, the storage client layer of the network card converts the second block device access requests from a format that supports the SPDK internal communication protocol to a protocol format that supports communication with the storage nodes of the storage cluster.

S2032: the storage client layer of the network card sending a second block device access request to the target storage node where the block device corresponding to the second block device identifier is located based on the protocol for communicating with storage nodes of the storage cluster.

In some embodiments, the network card is connected communicatively with the storage cluster through the storage client layer. Based on an established communication connection, the storage client layer sends the second block device access request that complies with the protocol for communicating with storage nodes of the storage cluster to the target storage node in the storage cluster where the block device corresponding to the second block device identifier is located.

S204: the network card receiving a second block device access response sent by the target storage node.

Wherein, the second block device access response includes at least: the mirror image data corresponding to the root file system.

In some embodiments, the second block device access response may also include: a second block device identifier.

In some embodiments, the storage client layer of the network card receives a second block device access response sent by the target storage node in the storage cluster, wherein the format of the second block device access response complies with a protocol for communicating with storage nodes of the storage cluster.

S205: the network card obtaining a first block device access response based on the second block device access response.

Wherein, the first block device access response includes at least: the mirror image data corresponding to the root file system. In some embodiments, the first block device access response may also include: a first block device identifier.

One possible implementation is:

S2051: the storage client of the network card performing protocol conversion on the second block device access response, and converting the second block device access response from a protocol format that supports communication with storage nodes of the storage cluster to a format that supports the SPDK internal communication protocol.

S2052: the general block layer of the network card submitting the second block device access response to the general block layer of the network card based on the SPDK internal communication protocol.

S2053: the general block layer of the network card submitting the second block device access response to the NVMf target layer of the network card based on the SPDK internal communication protocol.

S2054: the NVMf target layer of the network card processing the second block device access response to obtain target data, and generating the first block device access response based on the target data and the first block device identifier in the first block device access request.

Wherein, the format of the first block device access response complies with the NVMf protocol.

S206: the network card sending the first block device access response to the host based on the NVMf communication connection.

The NVMf target layer of the network card sends the first block device access response to the RDMA layer of the host through the RDMA layer of the network card.

The RDMA layer of the host submits the first block device access response to the NVMf host layer of the host.

The NVMf host layer processes the first block device access response, generates an NVMe block device access response, and submits the NVMe block device access response to the block device layer of the host, the NVMe block device access response including: the target data and the first block device identifier.

S207: the host receiving the first block device access response, and mounting the root file system based on the mirror image data corresponding to the root file system, to complete system startup.

The block device layer of the host obtains the type of the root file system and the storage location of the root directory based on the target data received for the first time. If the target data does not include all the block data of the mirror image data corresponding to the root file system, it returns to perform S201-S206 until all block data of the mirror image data corresponding to the root file system are received. The host mounts the root file system based on the mirror image data corresponding to the root file system and completes system startup.

In this embodiment, the host sends the first block device access request to the network card based on the NVMf communication connection. Wherein, the first block device access request includes: NON, the first block device access request being used to obtain the mirror image data corresponding to the root file system; the network card obtains the second block device access request based on the first block device access request, the second block device access request including the second block device identifier corresponding to the NON; the network card sends the second block device access request to the target storage node where the block device corresponding to the second block device identifier is located; the network card receives the second block device access response sent by the target storage node, the second block device access response including the mirror image data corresponding to the root file system; the network card obtains the first block device access response based on the second block device access response; the network card sends the first block device access response to the host based on the NVMf communication connection; the host mounts the root file system according to the mirror image data corresponding to the root file system to complete the system startup. Because the NVMf protocol can provide faster data reading speed and lower access latency than the existing iSCSI protocol, and the host obtains the mirror image data corresponding to the root file system from the network card based on the NVMf communication connection, the storage access latency of the host is reduced, thereby improving the efficiency of server system startup.

In some embodiments, after the system startup is completed, the host initiates an I/O request to the network card through the NVMf protocol, and the network card processes the I/O request and sends it to block devices of the storage cluster. Since the NVMf protocol can provide faster read and write speeds, lower storage access latency, and higher throughput, the host initiating an I/O request to the network card through the NVMf protocol reduces the storage access latency of the host and improves the storage performance of the server.

FIG. 4 is a schematic flowchart of another server system starting method embodiment provided by some embodiments of the present disclosure. FIG. 4 is on the basis of the embodiment shown in FIG. 2, and the following steps are also included before S201, as shown in FIG. 4.

S301: The host and network card establish a communication connection based on NVMf.

One possible implementation is:

S3011: the host obtaining a driver of the NVMf and configuration information of a NVMf target.

Wherein, the configuration information of the NVMf target includes: an Internet Protocol IP address, a port, an NON and a transport layer protocol of the NVMf target.

Figure 5:
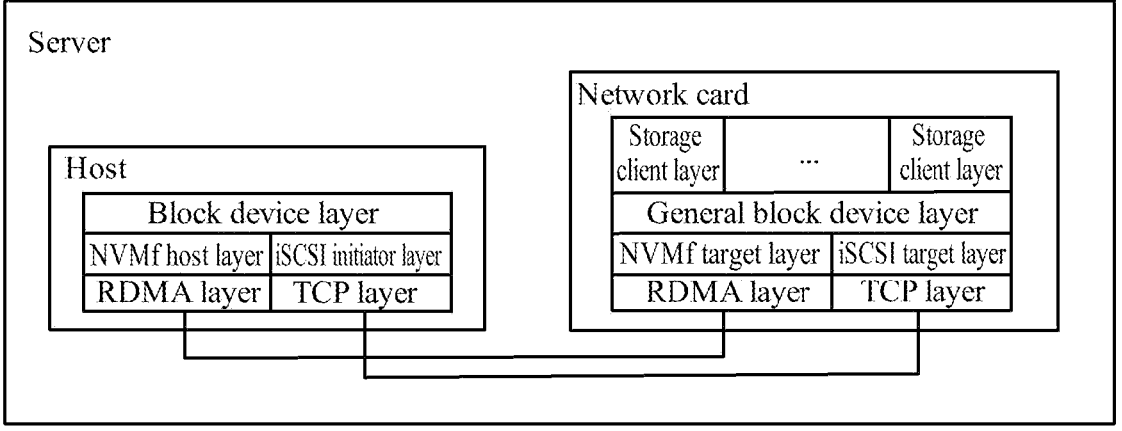
FIG. 5 is a schematic structural diagram of another server provided by some embodiments of the present disclosure.

One possible implementation is:

FIG. 5 is a schematic structural diagram of another server provided by some embodiments of the present disclosure. FIG. 5 is on the basis of the server shown in FIG. 3, and the host also includes an iSCSI initiator layer and a Transmission Control Protocol (TCP) layer, and the network card also includes: an iSCSI target layer and a TCP layer. The iSCSI target layer and the TCP layer of the network card can be implemented by way of software, for example, through SPDK.

Based on the server shown in FIG. 5,

S30111: the host and network card establish a communication connection based on the iSCSI.

After the server is powered on, the host runs the BIOS and starts the iSCSI initiator layer.

The iSCSI initiator layer of the host searches for the name of an iSCSI target end according to a preset Internet Protocol (IP) address of the iSCSI target end, and sends a communication connection establishment request (for example: login command) to the iSCSI target layer of the network card based on the name of the iSCSI target end, the communication connection establishment request being used to request communication with the network card based on iSCSI.

The iSCSI initiator layer of the host receives a communication connection establishment response sent by the iSCSI target layer of the network card, the communication connection establishment response being used to indicate that the connection establishment is successful.

The host generates a third block device identifier, which represents a virtual SCSI block device of the host, for example: sda1.

S30112: The host sends a third block device access request to the network card based on the iSCSI communication connection.

The block device layer of the host initiates a SCSI block device access request according to the third block device identifier, and submits the SCSI block device access request to the iSCSI initiator layer of the host. Wherein, the SCSI block device access request includes: a third block device identifier, a starting number of the data blocks and the number of data blocks, where the starting number of the data block represents the starting number of the block data obtained by the SCSI block device access request stored in the virtual SCSI block device, and the number of data blocks represents the size of the block data obtained by the SCSI block device access request.

The iSCSI initiator layer of the host generates a third block device access request, and sends the third block device access request to the TCP layer of the network card through the TCP layer of the host. Wherein, the third block device access request includes: the third block device identifier and the Internet Small Computer System Interface Qualified Name (iSCSI Qualified Name, IQN). The third block device access request is used to obtain data corresponding to the startup mirror image file, and the data corresponding to the startup mirror image file includes: a boot loader, a kernel mirror image file, kernel startup parameters, an initial RAM Disk (initrd) file, etc. The initrd file includes: NVMe, NVMf, and RDMA, etc. drivers, and the kernel startup parameters include: configuration information of an NVMf target.

S30113: The network card processes the third block device access request to obtain a fourth block device access request.

The TCP layer of the network card receives the third block device access request and submits the third block device access request to the iSCSI target layer of the network card.

The iSCSI target layer of the network card performs protocol conversion on the third block device access request, and converts the third block device access request into an internal communication protocol of the SPDK.

The iSCSI target layer of the network card submits the third block device access request to the general block layer of the network card based on the internal communication protocol of the SPDK.

The general block layer of the network card determines a fourth block device identifier corresponding to the ION based on the ION, and generates a fourth block device access request. Wherein, the fourth block device access request includes: the fourth block device identifier corresponding to the IQN. The fourth block device access request is used to obtain data stored on the block device in the storage cluster corresponding to the fourth block device identifier. The data stored on the block device in the storage cluster corresponding to the fourth block device identifier includes: data corresponding to a startup mirror image file, the data corresponding to the startup mirror image file including: a boot loader, a kernel mirror image file, kernel startup parameters, an initrd file, etc.

The general block layer of the network card submits the fourth block device access request to the storage client layer.

S30114: The network card sends the fourth block device access request to a target storage node where the block device corresponding to the fourth block device identifier is located.

The storage client layer of the network card performs protocol conversion on the fourth block device access request, and converts the fourth block device access request into a protocol that is complies with communication with storage nodes of the storage cluster.

The storage client layer of the network card sends a fourth block device access request to the target storage node where the block device corresponding to the fourth block device identifier is located based on the protocol for communicating with storage nodes of the storage cluster.

S30115: The network card receives the fourth block device access response sent by the target storage node where the block device corresponding to the fourth block device identifier is located.

Wherein, the fourth block device access response includes: a fourth block device identifier and data corresponding to the startup mirror image file. The data corresponding to the startup mirror image file includes: a boot loader, a kernel mirror image file, kernel startup parameters, an initrd file, etc. The initrd file includes: NVMe, NVMf, and RDMA, etc. drivers, and the kernel startup parameters include: configuration information of an NVMf target.

S30116: The network card processes the fourth block device access response to obtain a third block device access response.

The storage client of the network card performs protocol conversion on the fourth block device access response, and converts the fourth block device access response from a protocol format that supports communication with storage nodes of the storage cluster to a format that supports an internal communication protocol of the SPDK.

The general block layer of the network card submits the fourth block device access response to the general block layer of the network card based on the internal communication protocol of the SPDK.

The general block layer of the network card submits the fourth block device access response to the iSCSI target layer of the network card based on the internal communication protocol of the SPDK.

The iSCSI target layer of the network card processes the fourth block device access response to obtain the third block device access response. Wherein, the third block device access response includes: the third block device identifier and the data corresponding to the startup mirror image file. The data corresponding to the startup mirror image file includes: a boot loader, a kernel mirror image file, kernel startup parameters, an initrd file, etc.

S30117: The network card sends the third block device access response to the host based on the iSCSI communication connection.

The iSCSI target layer of the network card sends the third block device access response to the TCP layer of the host through the TCP layer of the network card.

The TCP layer of the host submits the third block device access response to the iSCSI initiator layer of the host.

The iSCSI initiator layer processes the third block device access response, generates a SCSI block device access response, and submits the SCSI block device access response to the block device layer of the host. The SCSI block device access response includes: the third block device identifier and the data corresponding to the startup mirror image file, the data corresponding to the startup mirror image file includes: a boot loader, a kernel mirror image file, kernel startup parameters and an initrd file, etc.

S30118: The host obtains the driver of the NVMf and the configuration information of the NVMf target based on the data corresponding to the startup mirror image file.

If the block device layer of the host determines that all block data of the data corresponding to the startup mirror image file has not been obtained according to the SCSI block device access response, it returns to execute S30111-S30117 until all block data of the mirror image data corresponding to the root file system is received.

The host loads the boot loader (for example, a multi-operating system startup manager GR and Unified Boot-loader), the kernel startup parameters, the kernel mirror image file, and the initrd file into a memory, and executes the boot loader. The host uses the boot loader to execute the kernel mirror image file to start the kernel, and passes the storage address of the initrd file in the memory and the kernel startup parameters to the kernel. After the kernel startup is completed, the initialization process in the initrd file is started. The initialization process loads the NVMe, NVMf, and RDMA, etc. drivers in the initrd file, parses the kernel startup parameters to obtain the configuration information of the NVMf target. The configuration information of the NVMf target includes: the IP address, port number, NON, and transmission protocol (for example: RDMA) of the NVMf target.

S3012: The host sends a communication connection establishment request to the network card based on the configuration information of the NVMf target.

Wherein, the communication connection establishment request is used to request communication with the network card based on the NVMf.

In some embodiments, the communication connection establishment request may be a connect command in the NVMf protocol. For example: the configuration information of the NVMf target includes: the IP address 192.168.1.1, the port number 4420 corresponding to the NVMf target, the NON which is ngn.2016-06.io.spdk:cnode0, and the transmission protocol RDMA, and the communication connection establishment request sent by the host to the NVMf target: nvme connect -t rdma -n "ngn.2016-06.io.spdk:cnode0"-a 192.168.1.1 -s 4420.

S3013: The host receives the communication connection establishment response sent by the network card.

Wherein, the communication connection establishment response is used to indicate that the connection establishment is successful.

S3014: The host generates the first block device identifier.

Wherein, the first block device identifier represents the virtual NVMe block device of the host. The host can generate the first block device identifier according to preset rules. For example, the first block device identifier is a string nvmeXnYpZ, where X, Y, and Z are digits arranged starting from 1.

In this embodiment, prior to the host sending the first block device access request to the network card based on the NVMf communication connection, the host and the network card establish a communication connection based on the NVMf, so that the host can obtain the mirror image data corresponding to the root file system through the network card based on the NVMf connection, which reduces the storage access latency of the host, thereby improving the efficiency of server system startup.

In some embodiments, before S301, it also comprises:

Load SPDK on the network card, and then start the SPDK.

Start the NVMf target layer of the SPDK, configure the NVMf target information (for example: NON, the block device identifier of the storage cluster corresponding to NON, etc.), and establish communication connections between the NVMf target layer, the general block layer, the storage client layer and the storage cluster.

Start the iSCSI target layer of the SPDK, configure the confidence of the iSCSI target (for example: ION, the block device identifier of the storage cluster corresponding to IQN), and establish communication connections between the iSCSI target layer, the general block layer, the storage client layer and the storage cluster.

Figure 6:
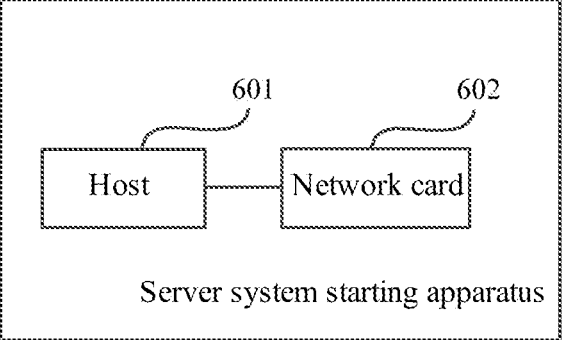
FIG. 6 is a schematic structural diagram of a server system starting apparatus provided by some embodiments of the present disclosure.

FIG. 6 is a schematic structural diagram of a server system starting apparatus provided by some embodiments of the present disclosure. The server system starting apparatus in the embodiment of the present disclosure is applied to the server shown in FIG. 1. As shown in FIG. 6, the apparatus in the embodiment comprises: a host 601 and a network card 602.

Wherein, the host 601 is configured to send a first block device access request to the network card based on the NVMf communication connection, wherein the first block device access request includes: a non-volatile memory standard qualified name NON corresponding to the NVMf, the first block device access request being used to obtain mirror image data corresponding to a root file system;

The network card 602 is configured to process the first block device access request to obtain a second block device access request, the second block device access request including: a second block device identifier corresponding to the NON;

The network card 602 is further configured to send the second block device access request to a target storage node where the block device corresponding to the second block device identifier is located;

The network card 602 is further configured to receive a second block device access response sent by the target storage node, the second block device access response including: target data and the second block device identifier, the target data including mirror image data corresponding to the root file system;

The network card 602 is further configured to process the second block device access response to obtain a first block device access response, the first block device access response including: the target data and the first block device identifier;

The network card 602 is further configured to send the first block device access response to the host based on the NVMf communication connection;

Host 601 is further configured to mount the root file system to complete system startup.

In some embodiments, the host 601 comprises: a block device layer, an NVMf host layer and a remote direct data access RDMA layer, and the network card 602 comprises: an RDMA layer, an NVMf target layer, a general block layer and a storage client layer;

The block device layer of the host is configured to generate an NVMe block device access request based on the first block device identifier, and submit the NVMe block device access request to the NVMf host layer of the host, the NVMe block device access request including: the first block device identifier;

The NVMf host layer of the host is configured to encapsulate the NVMe block device access request into a first block device access request that complies with the NVMf protocol, and sends it to the RDMA layer of the network card through the RDMA layer of the host.

The RDMA layer of the network card is configured to receive the first block device access request and submit the first block device access request to the NVMf target layer of the network card;

The NVMf target layer of the network card is configured to submit the first block device access request to the general block layer of the network card;

The general block layer of the network card is configured to determine the second block device identifier corresponding to the NON based on the NON, and generate the second block device access request;

The general block layer of the network card is further configured to submit second block device access requests to the storage client layer.

In some embodiments, the NVMf target layer of the network card is specifically configured to perform protocol conversion on the first block device access request, and convert the first block device access request into an internal communication protocol;

The NVMf target layer of the network card is specifically configured to submit the first block device access request to the general block layer of the network card based on the internal communication protocol.

In some embodiments, the storage client layer of the network card is configured to perform protocol conversion on the second block device access request, and convert the second block device access request into a protocol that complies with communication with storage nodes of the storage cluster;

The storage client layer of the network card is further configured to send the second block device access request to a target storage node where the block device corresponding to the second block device identifier is located based on a protocol for communicating with storage nodes of the storage cluster.

In some embodiments, the host 601 is also configured to establish a communication connection with the network card based on the non-volatile memory standard NVMf on the network.

In some embodiments, the host 601 is specifically configured to obtain the driver of the NVMf and the configuration information of the NVMf target, wherein the configuration information of the NVMf target includes: an Internet Protocol IP address, a port, the NON and a transport layer protocol of the NVMf target;

The host 601 is specifically configured to send a communication connection establishment request to the network card based on the configuration information of the NVMf target, the communication connection establishment request being used to request communication with the network card based on the NVMf;

The host 601 is specifically configured to receive a communication connection establishment response sent by the network card, the communication connection establishment response being used to indicate that the connection establishment is successful;

The host 601 is specifically configured to generate the first block device identifier.

The apparatus of this embodiment can be used to execute the technical solution of the method embodiment shown in any one of the above FIGS. 1 to 5. Its implementation principles and technical effects are similar, which will not be repeated here.

Some embodiments of the present disclosure provides an electronic device, comprising: a processor configured to execute a computer program stored in a memory, which, when executed by the processor, implement the technical solution of the method shown in any one of the FIGS. 1 to 5. Its implementation principles and technical effects are similar, which will not be repeated here.

The present disclosure also provides a computer-readable storage medium having a computer program stored thereon, which, when executed by a processor, implement the technical solution of the method embodiment shown in any one of the FIGS. 1 to 5.

The computer-readable storage medium may adopt any combination of one or more readable media. The readable medium may be a readable signal medium or a readable storage medium. The readable storage medium may include, but not limited to, for example, electrical, magnetic, optical, electromagnetic, infrared, or semiconductor systems, apparatus or devices, or any combination thereof. More specific examples (non-exhaustive list) of the readable storage medium include: electrical connection with one or more conductors, portable disk, hard disk, random access memory (RAM), read only memory (ROM), erasable programmable read-only memory (EPROM or flash memory), optical fiber, portable compact disk read-only memory (CD-ROM), optical storage device, magnetic storage device, or any suitable combination thereof.

The present disclosure provides a computer program product, which, when run on a computer, causes the computer to execute the server system starting method of any one of FIGS. 1 to 5.

The computer program product may be written with program code for performing operations of embodiments of the present disclosure in any combination of one or more programming languages, including object-oriented programming languages such as Java, C++, etc., and conventional procedural programming languages such as the "C" language or similar programming languages. The program code may execute entirely on a user's computing device, partly on a user's device, as a stand-alone software package, partly on a user's computing device and partly on a remote computing device, or entirely on a remote computing device or server.

It should be noted that, herein, relational terms such as "first" and "second" are used to distinguish one entity or operation from another entity or operation, and do not necessarily require or imply there is any such actual relationship or sequence between these entities or operations. Furthermore, the terms "comprise", "include" or any other variations thereof are intended to cover a non-exclusive inclusion such that a process, method, article, or device that comprises a list of elements includes not only those elements, but also other elements that are not expressly listed, or elements inherent to the process, method, article or device. Without further limitation, an element qualified by the statement "comprises a . . . " does not exclude the presence of additional identical elements in the process, method, article, or device that includes the element.

The above are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the disclosure. Therefore, the present disclosure is not to be limited to the embodiments described herein but is to be accorded with the widest scope consistent with the principles and novel features disclosed herein.

What is claimed is:

1. A server system starting method, wherein the server comprises a host and a network card, the host and the network card being based on a non-volatile memory standard NVMf communication connection on a network, the network card being connected communicatively with a storage cluster, the method comprising:

sending a first block device access request to the network card by the host based on the NVMf communication connection, where the first block device access request comprises at least a non-volatile memory standard qualified name NON corresponding to the NVMf, the first block device access request being used to obtain mirror image data corresponding to a root file system;

obtaining a second block device access request by the network card based on the first block device access request, the second block device access request including a second block device identifier corresponding to the NON;

sending the second block device access request to a target storage node where the block device corresponding to the second block device identifier is located by the network card, and receiving a second block device access response sent by the target storage node, the second block device access response including at least the mirror image data corresponding to the root file system;

obtaining a first block device access response by the network card based on the second block device access response, the first block device access response including at least the mirror image data corresponding to the root file system;

sending the first block device access response to the host by the network card based on the NVMf communication connection; and receiving the first block device access response by the host and mounts the root file system based on the mirror image data corresponding to the root file system to complete the system startup, wherein the host comprises: a block device layer, an NVMf host layer and a remote direct data access RDMA layer, and the network card comprises: an RDMA layer, an NVMf target layer, a general block layer and a storage client layer.

2. The method according to claim 1, wherein the sending the first block device access request to the network card by the host based on the NVMf communication connection comprises:

the block device layer of the host generating an NVMe block device access request according to a first block device identifier, and submitting the NVMe block device access request to the NVMf host layer of the host, the NVMe block device access request including the first block device identifier;

the NVMf host layer of the host encapsulating the NVMe block device access request into a first block device access request that complies with the NVMf protocol, and sending it to the RDMA layer of the network card through the RDMA layer of the host, the first block device access request including at least the NQN;

the obtaining the second block device access request by the network card based on the first block device access request comprises:

the RDMA layer of the network card receiving the first block device access request and submitting the first block device access request to the NVMf target layer of the network card;

the NVMf target layer of the network card submitting the first block device access request to the general block layer of the network card;

the general block layer of the network card determining the second block device identifier corresponding to the NQN based on the NQN, and generating a second block device access request;

the general block layer of the network card submitting the second block device access request to the storage client layer.

3. The method according to claim 2, wherein the NVMf target layer of the network card submitting the first block device access request to the general block layer of the network card comprises:

the NVMf target layer of the network card performing protocol conversion on the first block device access request, and converting the first block device access request into an internal communication protocol;

the NVMf target layer of the network card submitting the first block device access request to the general block layer of the network card based on the internal communication protocol.

4. The method according to claim 3, wherein the sending the second block device access request to a target storage node where the block device corresponding to the second block device identifier is located by the network card comprises:

the storage client layer of the network card performing protocol conversion on the second block device access request, and converting the second block device access request into a protocol that complies with communication with storage nodes of the storage cluster;

the storage client layer of the network card sending the second block device access request to the target storage node where the block device corresponding to the second block device identifier is located based on the protocol for communicating with storage nodes of the storage cluster.

5. The method according to claim 1, wherein, prior to the host sending the first block device access request to the network card based on the NVMf communication connection, the method further comprising:

the host and the network card establishing a communication connection based on the non-volatile memory standard NVMf on the network.

6. The method according to claim 5, wherein the host and the network card establishing a communication connection based on the non-volatile memory standard NVMf on the network comprises:

the host obtaining a NVMf driver and configuration information of an NVMf target, wherein the configuration information of the NVMf target includes: an Internet Protocol IP address, a port, the NQN and a transport layer protocol of the NVMf target;

the host sending a communication connection establishment request to the network card based on the configuration information of the NVMf target, the communication connection establishment request being used to request communication with the network card based on the NVMf;

the host receiving a communication connection establishment response sent by the network card, the communication connection establishment response being used to indicate that the connection establishment is successful;

the host generating the first block device identifier.

7. An electronic device, comprising a processor configured to execute a computer program stored in a memory, which, when executed by the processor, implements a server system starting method, wherein the server comprises a host and a network card, the host and the network card being based on a non-volatile memory standard NVMf communication connection on a network, the network card being connected communicatively with a storage cluster, the server system starting method comprises:

sending a first block device access request to the network card by the host based on the NVMf communication connection, where the first block device access request comprises at least a non-volatile memory standard qualified name NON corresponding to the NVMf, the first block device access request being used to obtain mirror image data corresponding to a root file system;

obtaining a second block device access request by the network card based on the first block device access request, the second block device access request including a second block device identifier corresponding to the NON;

sending the second block device access request to a target storage node where the block device corresponding to the second block device identifier is located by the network card, and receiving a second block device access response sent by the target storage node, the second block device access response including at least the mirror image data corresponding to the root file system;

obtaining a first block device access response by the network card based on the second block device access response, the first block device access response including at least the mirror image data corresponding to the root file system;

sending the first block device access response to the host by the network card based on the NVMf communication connection; and receiving the first block device access response by the host and mounts the root file system based on the mirror image data corresponding to the root file system to complete the system startup, wherein the host comprises: a block device layer, an NVMf host layer and a remote direct data access RDMA layer, and the network card comprises: an RDMA layer, an NVMf target layer, a general block layer and a storage client layer.

8. The electronic device of claim 7, wherein the sending the first block device access request to the network card by the host based on the NVMf communication connection comprises:

the block device layer of the host generating an NVMe block device access request according to a first block device identifier, and submitting the NVMe block device access request to the NVMf host layer of the host, the NVMe block device access request including the first block device identifier;

the NVMf host layer of the host encapsulating the NVMe block device access request into a first block device access request that complies with the NVMf protocol, and sending it to the RDMA layer of the network card through the RDMA layer of the host, the first block device access request including at least the NQN;

the obtaining the second block device access request by the network card based on the first block device access request comprises:

the RDMA layer of the network card receiving the first block device access request and submitting the first block device access request to the NVMf target layer of the network card;

the NVMf target layer of the network card submitting the first block device access request to the general block layer of the network card;

the general block layer of the network card determining the second block device identifier corresponding to the NQN based on the NQN, and generating a second block device access request;

the general block layer of the network card submitting the second block device access request to the storage client layer.

9. The electronic device of claim 8, wherein the NVMf target layer of the network card submitting the first block device access request to the general block layer of the network card comprises:

the NVMf target layer of the network card performing protocol conversion on the first block device access request, and converting the first block device access request into an internal communication protocol;

the NVMf target layer of the network card submitting the first block device access request to the general block layer of the network card based on the internal communication protocol.

10. The electronic device of claim 9, wherein the sending the second block device access request to a target storage node where the block device corresponding to the second block device identifier is located by the network card comprises:

the storage client layer of the network card performing protocol conversion on the second block device access request, and converting the second block device access request into a protocol that complies with communication with storage nodes of the storage cluster;

the storage client layer of the network card sending the second block device access request to the target storage node where the block device corresponding to the second block device identifier is located based on the protocol for communicating with storage nodes of the storage cluster.

11. The electronic device of claim 7, wherein, prior to the host sending the first block device access request to the network card based on the NVMf communication connection, the server system starting method further comprising:

the host and the network card establishing a communication connection based on the non-volatile memory standard NVMf on the network.

12. The electronic device of claim 11, wherein the host and the network card establishing a communication connection based on the non-volatile memory standard NVMf on the network comprises:

the host obtaining a NVMf driver and configuration information of an NVMf target, wherein the configuration information of the NVMf target includes: an Internet Protocol IP address, a port, the NQN and a transport layer protocol of the NVMf target;

the host sending a communication connection establishment request to the network card based on the configuration information of the NVMf target, the communication connection establishment request being used to request communication with the network card based on the NVMf;

the host receiving a communication connection establishment response sent by the network card, the communication connection establishment response being used to indicate that the connection establishment is successful;

the host generating the first block device identifier.

13. A non-transitory computer-readable storage medium having a computer program stored thereon, which, when executed by a processor, implements a server system starting method, wherein the server comprises a host and a network card, the host and the network card being based on a non-volatile memory standard NVMf communication connection on a network, the network card being connected communicatively with a storage cluster, the server system starting method comprises:

sending a first block device access request to the network card by the host based on the NVMf communication connection, where the first block device access request comprises at least a non-volatile memory standard qualified name NON corresponding to the NVMf, the first block device access request being used to obtain mirror image data corresponding to a root file system;

obtaining a second block device access request by the network card based on the first block device access request, the second block device access request including a second block device identifier corresponding to the NON;

sending the second block device access request to a target storage node where the block device corresponding to the second block device identifier is located by the network card, and receiving a second block device access response sent by the target storage node, the second block device access response including at least the mirror image data corresponding to the root file system;

obtaining a first block device access response by the network card based on the second block device access response, the first block device access response including at least the mirror image data corresponding to the root file system;

sending the first block device access response to the host by the network card based on the NVMf communication connection; and receiving the first block device access response by the host and mounts the root file system based on the mirror image data corresponding to the root file system to complete the system startup, wherein the host comprises: a block device layer, an NVMf host layer and a remote direct data access RDMA layer, and the network card comprises: an RDMA layer, an NVMf target layer, a general block layer and a storage client layer.

14. The non-transitory computer-readable storage medium of claim 13, wherein the sending the first block device access request to the network card by the host based on the NVMf communication connection comprises:

the block device layer of the host generating an NVMe block device access request according to a first block device identifier, and submitting the NVMe block device access request to the NVMf host layer of the host, the NVMe block device access request including the first block device identifier;

the NVMf host layer of the host encapsulating the NVMe block device access request into a first block device access request that complies with the NVMf protocol, and sending it to the RDMA layer of the network card through the RDMA layer of the host, the first block device access request including at least the NON;

the obtaining the second block device access request by the network card based on the first block device access request comprises:

the RDMA layer of the network card receiving the first block device access request and submitting the first block device access request to the NVMf target layer of the network card;

the NVMf target layer of the network card submitting the first block device access request to the general block layer of the network card;

the general block layer of the network card determining the second block device identifier corresponding to the NQN based on the NON, and generating a second block device access request;

the general block layer of the network card submitting the second block device access request to the storage client layer.

15. The non-transitory computer-readable storage medium of claim 14, wherein the NVMf target layer of the network card submitting the first block device access request to the general block layer of the network card comprises:

the NVMf target layer of the network card performing protocol conversion on the first block device access request, and converting the first block device access request into an internal communication protocol;

the NVMf target layer of the network card submitting the first block device access request to the general block layer of the network card based on the internal communication protocol.

16. The non-transitory computer-readable storage medium of claim 15, wherein the sending the second block device access request to a target storage node where the block device corresponding to the second block device identifier is located by the network card comprises:

the storage client layer of the network card performing protocol conversion on the second block device access request, and converting the second block device access request into a protocol that complies with communication with storage nodes of the storage cluster;

the storage client layer of the network card sending the second block device access request to the target storage node where the block device corresponding to the second block device identifier is located based on the protocol for communicating with storage nodes of the storage cluster.

17. The non-transitory computer-readable storage medium of claim 13, wherein, prior to the host sending the first block device access request to the network card based on the NVMf communication connection, the server system starting method further comprising:

the host and the network card establishing a communication connection based on the non-volatile memory standard NVMf on the network.

18. The non-transitory computer-readable storage medium of claim 17, wherein the host and the network card establishing a communication connection based on the non-volatile memory standard NVMf on the network comprises:

the host obtaining a NVMf driver and configuration information of an NVMf target, wherein the configuration information of the NVMf target includes: an Internet Protocol IP address, a port, the NQN and a transport layer protocol of the NVMf target;

the host sending a communication connection establishment request to the network card based on the configuration information of the NVMf target, the communication connection establishment request being used to request communication with the network card based on the NVMf;

the host receiving a communication connection establishment response sent by the network card, the communication connection establishment response being used to indicate that the connection establishment is successful;

the host generating the first block device identifier.

* * * * *